United States Patent
Vik

[11] 3,730,221
[45] May 1, 1973

[54] HYDRAULIC COUPLER WITH PRESSURE RELIEF MECHANISM

[75] Inventor: Albam M. Vik, New Brighton, Minn.

[73] Assignee: Dempco, Inc., Minneapolis, Minn.

[22] Filed: July 9, 1971

[21] Appl. No.: 161,154

[52] U.S. Cl. ......... 137/614, 137/614.04, 137/614.19
[51] Int. Cl. ............................................. F16l 29/00
[58] Field of Search ..................... 137/614, 614.06, 137/614.11, 614.19, 614.02, 614.04, 614.05

[56] References Cited

UNITED STATES PATENTS

| | | | |
|---|---|---|---|
| 2,887,124 | 5/1959 | Mehl | 137/614.06 |
| 3,599,670 | 8/1971 | Gurner | 137/614.06 |
| 3,170,486 | 2/1965 | De Witt | 137/614 |
| 3,035,609 | 5/1962 | Dyer | 137/614 |
| 3,587,634 | 6/1971 | Drause | 137/614.19 |
| 2,959,024 | 11/1960 | Eckert | 137/614.06 |

Primary Examiner—William R. Cline
Attorney—Ralph L. Dugger et al.

[57] ABSTRACT

A hydraulic coupler having two portions for hydraulic lines used, for example, in agricultural applications, which has an actuating device to open check valves to permit flow of fluid under pressure through said lines in response to pressure signals, for example a pressure signal in one line. The device also can be actuated to close the check valves to prevent flow through the coupler. The device is operable to permit the coupling or uncoupling of the two portions of the coupler without actuation against a high pressure.

18 Claims, 3 Drawing Figures

Patented May 1, 1973
3,730,221
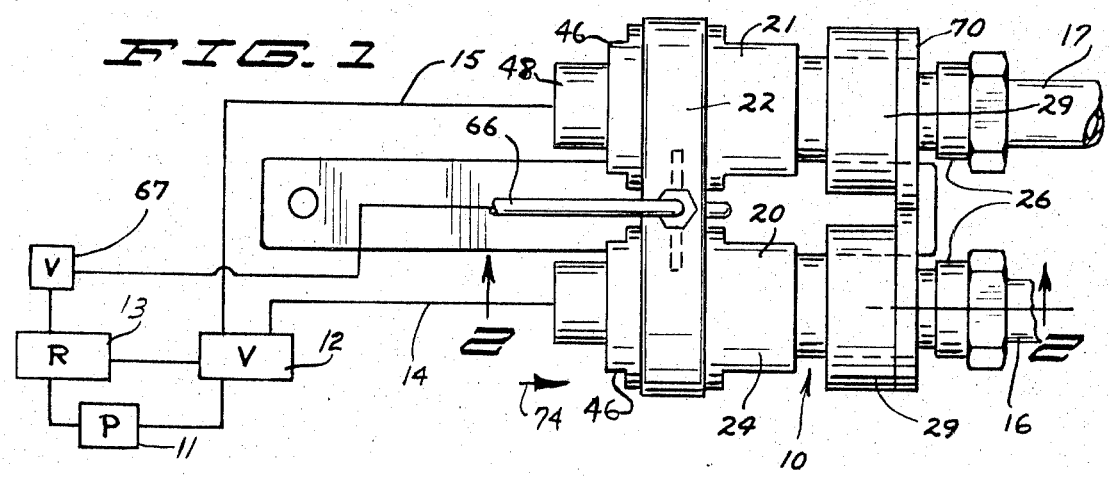
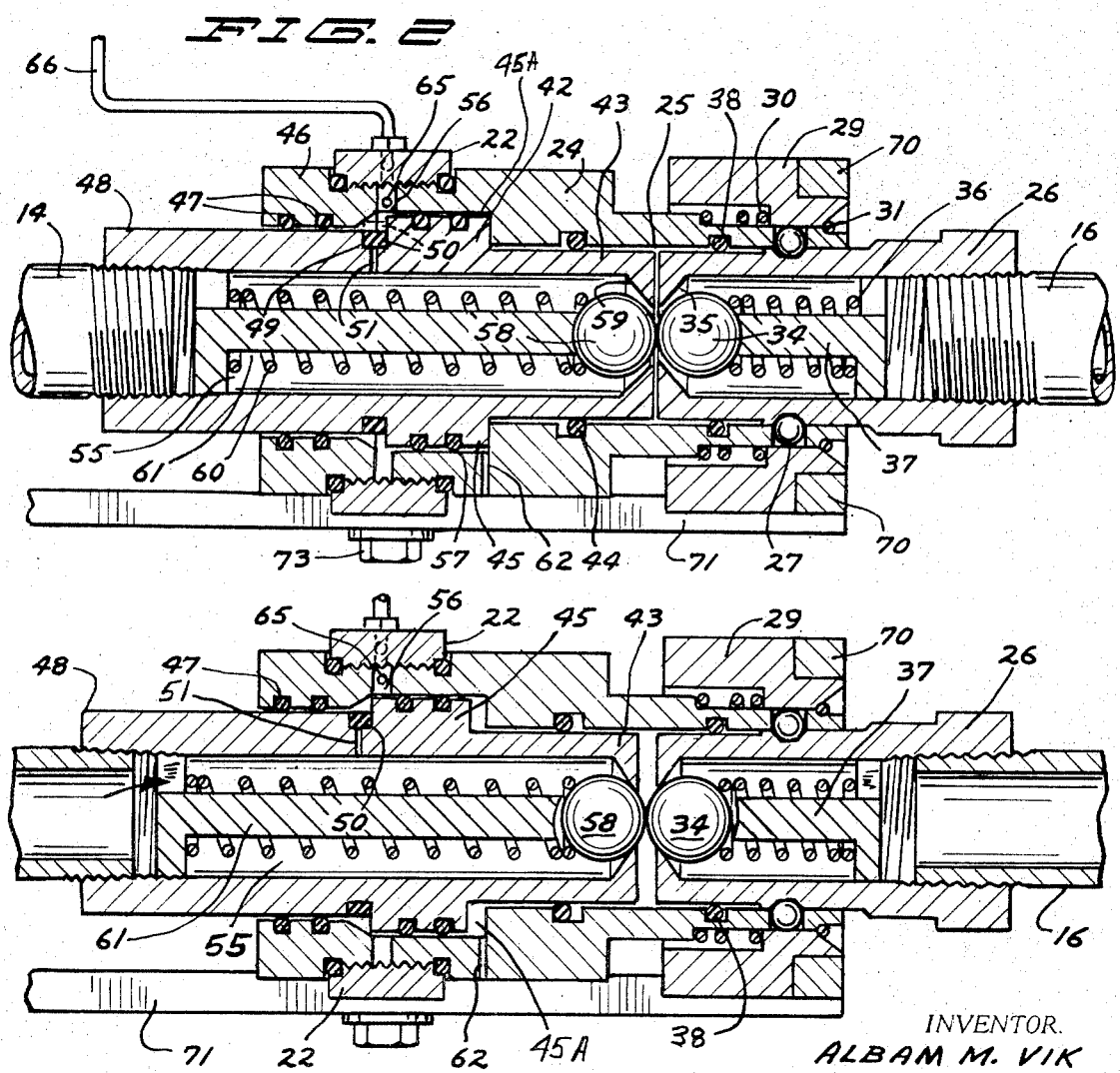
INVENTOR.
ALBAM M. VIK
BY
Dugger, Peterson, Johnson & Westman
ATTORNEYS

HYDRAULIC COUPLER WITH PRESSURE RELIEF MECHANISM

BACKGROUND OF THE INVENTION

1. Field of the Invention.

The present invention relates to coupling devices which are safe and can be coupled or uncoupled easily.

2. Prior Art.

In the prior art, quick disconnect hydraulic couplers are quite well known. However, the present devices utilizes a pressure actuated valve means which will operate to open up fluid communication between a remote line nipple and a pressure line, and which, when the fluid under pressure is shut off by a control valve will permit easy coupling or uncoupling of the nipple even when the line for the remote nipple is under pressure.

A quick disconnect coupling that utilizes a pressure actuated valve but which operated in reverse from the present device is shown in U.S. Pat. No. 2,678,834.

U.S. Pat. No. 3,543,763 shows a valve device that has a pressure actuated piston, for actuation, but does not involve a quick disconnect coupler and operates on a different principle.

Other examples of quick coupling devices are shown in U.S. Pat. No. 3,490,491, which has a plunger actuator for a coupled nipple check valve, and also U.S. Pat. No. 3,035,857.

However, none of these prior devices disclose a safe hydraulic line coupler having a fluid pressure actuated control body that can be actuated to permit fluid flow through a remote hydraulic line and will also permit easy coupling and uncoupling of the device when the remote line is under pressure.

SUMMARY OF THE INVENTION

The present invention relates to a quick coupling device for use with hydraulic systems having remote lines. The coupler of the present invention is designed primarily for use with lines that are coupled to a valve for controlling flow through at least one line to a remote hydraulic cylinder or motor that is operated intermittently. The present coupler is constructed with a movable internal actuator body that is pressure actuated. Actuating pressure causes the actuator body to open flow through the coupler.

The coupler comprises a main housing and a conventional disconnecting nipple having a ball valve at its end. The actuator body is in the main housing, and when actuated engages and opens the ball valve in the connecting nipple and also a valve in the actuator body. Means are provided to relieve the pressure on the actuator body so that once the main control valve has shut off flow through the coupler, the pressure actuating the actuator body can be relieved and the ball valve in the connecting nipple will move to its closed position to prevent oil or hydraulic fluid from escaping through the nipple even if the remote line connected to the nipple is under high pressure. Also, at this time, the connecting nipple for the remote line can be easily disconnected from or reconnected to the main housing because there is no force on the nipple. When flow of fluid under pressure comes through the coupler housing the actuator body would again be moved under this pressure to its position wherein the nipple valve would be opened.

The actuator body is operated as shown by a piston member operating in a chamber of the coupler housing and can be operated through a check valve so that the actuator body will remain in position holding the ball valve in the nipple open until the piston chamber is independently relieved of pressure, either by a bleed valve, or by opening into a return line. However, in most double acting hydraulic systems, where two coupler bodies and two nipples are used, one carrying pressure and the other carrying return oil to the reservoir, it is only necessary to connect the piston chamber of the two coupler bodies together for fluid pressure communication so that the piston for the actuator body in both couplers will be actuated each time the main valve for the system is operated.

The coupler of the present invention provides a safety factor to insure that remote coupling nipples can be reconnected even if the pressure is extremely high.

Therefore, it is an object of the present invention to present a coupler that permits quick disconnection or reconnection even if the remote line being connected is under pressure, which has safety features as described, and which will operate simply and with a minimum number of parts.

BRIEF DESCRIPTION OF THE DRAWINGS

FIG. 1 is a top plan view of a pair of couplers for operating equipment and made according to the present invention;

FIG. 2 is a sectional view taken as on line 2—2 in FIG. 1; and

FIG. 3 is a sectional view taken as on substantially the same line as FIG. 2 showing an operating valve in a condition wherein it is not under pressure.

DESCRIPTION OF THE PREFERRED EMBODIMENT

A pair of hydraulic line coupling devices illustrated generally at 10 are shown together for double acting hydraulic systems where there is a pressure line leading from a source of pressure and a return line leading from a remote actuator for return flow. The flow through the lines is controlled by an ordinary four-way control valve 12 connected to a pump 11. A reservoir 13 can be provided, and when the main control valve 12 is operated, fluid under pressure will be sent through one of the lines 14 or 15, to a pressure actuated implement such as a hydraulic cylinder, and then hydraulic oil returning from the opposite side of the cylinder will flow through the other line back through the valve 12 and back to reservoir 13. The lines 14 and 15 are connected to the main bodies of the coupler assemblies. Remote lines 16 and 17 are connected to quick coupling nipples and lead to the remote implement.

The couplers, as shown, are ganged together so that there are two coupler bodies 20 and 21, respectively which are held together with a common manifold 22. Manifold 22 is a support for both coupler bodies so that the two coupler bodies move together. The coupler bodies 20 and 21 each are constructed as shown in FIGS. 2 and 3, and as shown comprise a coupler control housing 24. The coupler housing 24 is threaded into one end of an opening in the manifold 22 for the respective coupler body 20 or 21, (coupler 20 is shown in FIGS. 2 and 3) and the coupler housing has an internal bore 25.

A quick coupling check valve nipple 26 is inserted into the end of bore 25 opposite from the manifold. The nipple 26 is formed in the usual manner having an exterior annular groove into which detent lock balls 27 will fit. The lock balls 27 are carried by the coupler housing 24 in openings in the housing wall, and are held in place with a locking collar 29 which is slidably mounted over the outer periphery of the housing. The locking collar 29 is urged to the position shown in FIGS. 2 and 3 with a locking spring 30. The collar 29 is held in place on the housing 24 with a snap ring 31, and can be retracted rearwardly a sufficient distance to permit the balls 27 to move outwardly in their openings 27 to release the nipple 26. This is done in a conventional manner commonly used with quick disconnect couplers of this type. The nipple 26 leads to the remote cylinder or other hydraulic device through the respective lines 16 and 17. The nipple 26 has a ball check valve 34 which mates with an internal seat 35, and is urged toward this seat with a spring 36. The spring 36 is mounted over a ball guide and retainer 37 that is threaded on the interior of the nipple, and serves as a stop to prevent the ball 34 from moving too far away from its seat 35. The nipple can be sealed in the bore 25 with a suitable O-ring 38 in the usual manner. The retainer 37 has a head made with passageways to permit fluid flow past the head.

The housing 24 has a coupler actuator piston body 42 with a first portion 43 slidably mounted in the bore 25. The first portion 43 is sealed with an O ring 44 with respect to the bore 25. The body 42 also has a piston portion 45 that fits into a larger diameter bore 45A in the housing 24 adjacent the end of the housing 24 which mounts into the manifold 22. When the body 42 is in position as shown in FIG. 2, the forward end of piston 45 will stop against a shoulder formed between the bore 25 and the piston chamber 45A made for the piston in housing 24. The body 42 has a rear or inlet portion 48 extending rearwardly from the piston 45. A short collar 46 is threaded into the opposite side of the manifold 22 from housing 24 and as shown, the collar 46 has a pair of O-rings 47 that seal on the outer surface of the rear portion 48 of body 42. The diameter of the rear portion 48 is smaller than the outer diameter of the piston portion 45.

The body 42 has an annular groove 49 defined therein just to the rear of the piston portion 45, and this groove has a square cross section annular O-ring or elastomeric ring 50, fitted therein. A small orifice 51 passes from the interior or bottom surface of the groove 49 into the interior chamber 55 of the body 42. The O-ring 50 is elastic so that it will spring radially outwardly as shown in dotted lines in FIG. 2 or distant sufficiently to let hydraulic oil under pressure from the chamber 55 into the short annular chamber 56 inside the openings of the manifold which surrounds the body 42 to the rear of the housing 24 and to the front of the collar 46. The O-ring 50 will spring back into place in its groove and prevent hydraulic oil from flowing from chamber 56 back into the chamber 55 when the pressure in the chamber 55 is less than the pressure in the chamber 56. Thus the orifice 51 and O ring 50 act as a one way check valve.

The chamber 56 is open to and forms a part of the chamber 45A for piston portion 45. The piston portion 45 has O-rings 57 thereon which seal against the interior of the piston chamber 45A, in the usual manner.

A check valve ball 58 is mounted on the interior chamber 55 of the body 42, and this ball check valve mates with a seat 59 formed at the outlet end of chamber 55. The ball 58 is urged toward the seat 59 with a spring 60, that is mounted over a stud member 61 that has a head that is threadedly mounted on the interior of the chamber 55, and as shown, the head of stud 61 has passageways for hydraulic oil to flow into and through the interior chamber 55 just as with stud 37. The stud member 61 is positioned so that it prevents the ball valve 58 from moving too far away from the seat 59, and keeps the ball 58 in the proper position for operation. The line 14 is threaded to the end portion 48 of the body.

The housing 24 also has a small bleed hole 62 which opens into the piston chamber 45A adjacent the shoulder formed between the interior bore 25 and the piston chamber 45A, to prevent pressure from building up between the O-rings 57 and the O-ring 44.

The manifold 22 has a cross passageway 65 open to the chambers 56 for both of the coupler bodies 20 and 21, and this cross passageway 65 is open through a line 66 to a bleed valve 67 that opens to reservoir 13. When the elastic ring 50 is utilized with the present device, as will be more fully explained, the valve 67 can be used for bleeding the chamber 56 (and 45A) to permit the pistons 45 to move rearwardly to position as shown in FIG. 3 when valve 12 shuts off pressure through the lines 14 or 15.

For automatic uncoupling during use the sleeve members 29 are each machined to fit into an opening in bracket 70 that in turn is mounted onto a cross bar member 71 that can be fastened onto a vehicle or prime mover such as a tractor. The manifold 22 is slidably mounted to the bar member 71 through a cap screw 73 which slides on a bushing extending through a slot in the bar 71 to permit the coupler assemblies to slide with respect to the bar if they are subject to an external pulling force. Thus, a pull on the lines 14 or 16, for example, or either one of the remote coupler nipples 26, will cause the couplers 20 and 21 to slide in direction as indicated by the arrow 74, and this will move both housings 24 relative to the sleeve 29 (which are held by bracket 70) and releasing the balls 27 and permitting the nipples 26 to escape from the housings 24.

It should be noted that the two couplers 20 and 21 could be separately mounted on separate brackets that permit individual sliding movement of the couplers for release, and instead of having a unitary manifold 22 and cross passageway 65, the chambers 56 of the two couplers could be connected with a flexible tube to provide the cross feed between the chambers 56 on each of the couplers. Thus instead of having a solid manifold 22 mounting both couplers, each of the couplers could be independently mounted so the separate nipples can uncouple independently of each other. The tube connecting the chambers 56 would permit the coupler housings for the two units mounted side by side to move relative to each other to permit this individual uncoupling. In addition, there would be separate bars 71, and separate brackets 70 for each of the sleeves 29. It should be noted that the sectional views show the bottom portions of the manifold below the top of the bar 71 is because the manifold actually curves upwardly between the two couplers, and the bar 71 is slidably mounted relative to the manifold 22.

For an operational sequence assume that the main control valve 12 is operated so that fluid under pressure is applied to line 14. The pressure is also applied to chamber 55. The body 42 can be assumed to be in position as shown in FIG. 3, with the ball 34 closed off to prevent reverse flow out of the nipple 26, and the piston portion 45 moved away from the shoulder in the interior of the housing 24. When pressure builds up in the chamber 55 this pressure will be applied to the back side of the piston 45 through orifice 51. The ring 50 will move outwardly to permit fluid to flow and fill the chambers 56, on both of the couplers, and this pressure acting on each piston portion 45 will force the respective body 42 forwardly against the ball 34 and action of the spring 36. The ball 34 will rest on stud 37 and as the piston 45 is forced farther toward the shoulder, the ball 58 will be forced away from its seat to permit fluid to flow through the coupler. The full open position is shown in FIG. 2. This is where the piston 45 bottoms against the shoulder in the body 24. Then both the ball 58 and the ball 34 will be moved away from their respective seats, and fluid can flow through the coupler to the remote line 16 and then through the remote implement. The ball check valves of coupler 21 will be opened as well and the return line will thus be opened. It should be noted that the amount of back pressure in the line 14 will determine how far open the balls 34 and 58 are moved to provide flow. For example, if there is very little pressure and flow, the balls 34 and 58 do not have to be moved very far off their seats to permit the flow, but if the pressure builds up in chamber 55, and there is more demand, the body 42 will be forced all the way to its full open position shown in FIG. 2. The studs 61 and 37 do insure that both balls 58 and 34 will be mechanically moved from their seats when body 42 is actuated.

It should be noted that the area of the back side of the piston portion 45 between the outer surface of rear portion 48, and the outside diameter of the piston portion 45, as compared to the front end of the body 42 (the portion 43 that is in the bore 25) is about 2 to 1. In other words, the effective piston area is approximately twice that of the area of the outer end of the body 24, so that any pressure coming in through the coupler has twice the area to act on for operating the piston as the frontal area for on which pressure acts tending to move the body 42 away from engagement with the nipple 26.

Where two couplers 20 and 21 are used in conjunction with each other, the O-rings 50 can be eliminated, and the orifice 51 is made so that it has a very small amount of loss of fluid into the body 42 functioning as a return line because of reverse flow. When the orifice 51 is kept small the loss flow is at a minimum. When the elastic ring 50 is in place, the ring acts as a check valve so no fluid is lost through the return line. To relax the piston 45 the bleed valve 67 has to be opened.

It should be noted that without any check valve ring 50 in the system, and using two couplers, the body 42 will always return to its position wherein the valve balls 34 and 58 are closed to seal off flow through the coupler when the valve 12 is returned to neutral (no flow) this insures that the valve ball 34 will shut off so there will not be any accidental flow and consequent dropping of a remote implement when the valve 12 is in neutral. However, when the check valves comprising the elastic rings 50 that close off the orifices 51 from reverse flow are in place, the valve 67 can be cracked open to bleed the chambers 56 and permit the body 24 to move rearwardly so that the valve balls 34 and 58 close.

The bleed holes 62 prevent the build up of pressure on the front side of the piston portions 45, and permit air to move in each time the pistons retract. When the couplers automatically uncouples, so that the nipple 26 is removed, then the balls 58 will close off to shut off any flow tending to come through the lines. Recoupling is done under no force, even with pressure in the uncoupled line by making sure that the pressure is removed from chambers 56 by bleeding valve 67 if necessary, or permitting bleed through the return line. When pressure on the piston 45 is relieved the body 42 will move to its rearward position as the nipple 26 is inserted for ease of coupling the nipple 26 without having to overcome hydraulic pressure. This will make it easy to couple even if the line 16 carries a great deal of hydraulic pressure. The use of the bleed valve 67 will permit this retraction of the body 24 even with the check valves 50 in place.

When the couplers are used singly for single acting operations, a check valve such as 50 is always utilized to insure that the unit will operate satisfactorily.

A dust plug can be inserted in place of nipple 26 when the couplers are not in use. The dust plug would be a solid plug shaped like the nipple but with a cavity for the ball 58 so the ball 58 can remain closed. The plug is held in place by the detent balls 27. The end of the plug serves to keep the body 42 in its retracted position when the nipple 26 is removed for a long period of time.

The actuator body 42 slides in the housing for mechanical valve actuation of its own check valve and the valve in nipple under force from the piston actuator which, as shown is an integral portion of the body.

It should be noted that with a four-way control valve 12 either line 14 or 15 can be connected to drain or the reservoir and therefore if pressure builds up in these lines when the nipples 26 are removed, the pressure can be relieved by operating valve 12 so the actuator body can be retracted, or by operating valve 67.

The couplers also may be covered with dust excluding boots to keep dust off the moving body 42 and also the locking collar ends.

The larger area of the piston actuator portion 45 in respect to the end surface of end portion 43 insure that the device will operate even when the pressure in a remote line exceeds the normal pressure from pump 11. This higher pressure in the remote line can exist if the device is in the sun and the hydraulic oil expands. However, the 2:1 ratio, or some similar ratio insures a margin of operation.

It should also be noted that for safety purposes, if a remote implement is left, the chamber 56 can be bled so body 42 retracts, closing valve ball 34 to insure that the implement will be locked in position and won't accidently fall or retract. When the valve 12 is again operated, the actuator body 42 will move to open the circuit because of the pressure on the piston portion.

What is claimed is:

1. A hydraulic coupler device comprising a housing, a bore through said housing, coupling means at a first end of said housing, said coupling means comprising a releasable coupling element adapted to retain a check valve coupler nipple therein, a piston body slidably mounted in said bore, said piston body having an interior chamber, and valve means in said interior chamber and movable to and from position to prevent flow from said interior chamber, said piston body including a piston portion, said housing having a piston chamber therein in which the piston portion is mounted, means to introduce pressure into said piston chamber on the side thereof to force said piston body toward a check valve coupler nipple retained in said coupling element, and means on the coupler device cooperating with a check valve coupler nipple retained in said coupling element operative so that as said piston portion is moved under pressure said piston body actuates both a check valve coupler nipple held in said coupling element and the valve means in said interior chamber to open positions.

2. The combination as specified in claim 1 wherein said means to introduce pressure into said piston chamber comprises an orifice open from the interior chamber of said piston body through a wall thereof to said piston chamber.

3. The combination as specified in claim 2 and check valve means for said orifice preventing fluid flow back from said piston chamber into the interior chamber of said piston body.

4. The combination as specified in claim 3 wherein said check valve means for said orifice comprises an annular groove defined in the outer periphery of said piston body, said orifice leading from the interior of said piston body to said piston chamber opening through the bottom of said groove, and an elastic sealing ring mounted in said annular groove, said elastic sealing ring moving outwardly to permit fluid flow from the interior of said piston body outwardly through said orifice and groove but elastically moving back into said groove to prevent reverse flow through said orifice.

5. The combination as specified in claim 2 and a pressure relief orifice open to said piston chamber from atmosphere on an opposite side of said piston portion from the orifice leading from the interior of said piston body to said piston chamber.

6. The combination as specified in claim 1 and means for selectively relieving pressure in said piston chamber.

7. The combination as specified in claim 1 wherein said valve means in said piston body comprises a ball check valve having a portion protruding beyond the outer end face of said piston body when the ball check valve is in closed position, a coupler nipple attached to said coupling means having a ball check valve protruding outwardly beyond the end of said coupler nipple when the ball check valve of said coupler nipple is in closed position, and wherein said ball check valves engage each other as said piston body is actuated to mechanically force said ball check valves to open position.

8. The combination as specified in claim 7 and means to stop each of said ball check valves from moving away from their closed position more than a preselected amount.

9. The combination as specified in claim 1 wherein there are a pair of hydraulic coupler devices mounted in a hydraulic circuit and each of said coupler devices includes a piston body and a piston chamber, and passageway means between the piston chambers of said devices to permit fluid communication between said piston chambers.

10. The combination as specified in claim 1 wherein said coupling means comprises detent ball means, and a sleeve slidably mounted on the outer periphery of said housing and movable to a position to release said detent ball means, bias means moving said sleeve toward position wherein said detent ball means are held in engagement with a coupler nipple when said nipple is in place in said housing, and support means to support said sleeve while permitting relative movement of said housing with respect to said sleeve wherein an external pull on a coupler nipple held in the coupling means will move said housing relative to said sleeve to position where the detent balls are released to let said coupler nipple escape from said housing.

11. A hydraulic coupler device comprising a housing, a bore through said housing, a releasable coupling element adapted to retain a check valve coupler nipple relative to the housing with a portion of the coupler nipple in the bore, an actuator body axially slidably mounted in said bore, said actuator body having an interior chamber, and valve means in said interior chamber and movable to position to prevent flow from said interior chamber, piston actuator means coupled to said actuator body, means to introduce fluid pressure to said piston actuator means to force said actuator body toward a nipple retained in said coupling element, means cooperating with said actuator body so that as said piston actuator means is moved under pressure, said actuator body moves the valve means in said interior chamber to a position wherein a portion of the valve means will react against a coupler nipple check valve mounted on said coupling element and move both the valve means and the coupler nipple check valve to open position.

12. The combination as specified in claim 11 wherein said means to introduce pressure to said piston actuator means comprises separate check valve means to introduce pressure to said piston actuator means wherever said interior chamber is under pressure.

13. A coupling device comprising a housing means forming a flow passageway adapted to be releasably connected at one end to a first check valve means which in turn is operatively connected to a remote hydraulic apparatus, an actuator body movably mounted in said housing means, said actuator body having an internal passageway connected to a source of fluid under pressure, said actuator body including second check valve means normally preventing flow through said passageway in a first direction to said flow passageway, said first check valve means permitting flow in said first direction and normally preventing flow in an opposite direction, fluid pressure actuated means associated with said actuator body and when subjected to pressure being operable to move said actuator body in said first direction, and means responsive to movement of said actuator body to mechanically move both said first and second check valves to open position when the fluid pressure actuated means is subjected to fluid pressure.

14. The combination as specified in claim 13 and means to selectively retain fluid under pressure on said fluid pressure actuated means after pressure has once been present thereon.

15. The combination as specified in claim 13 wherein said fluid pressure actuated means comprises a piston member fixed to said actuator body and a piston chamber defined in said housing.

16. The combination of claim 13 wherein said means to move both said first and second check valves to open position includes a mechanical member which limits movement of said first check valve means as said first check valve means opens.

17. A hydraulic coupler device comprising a housing, releasable coupling means at a first end of said housing, a coupler nipple for releasable mounting in said releasable coupling means, said coupler nipple having a first check valve therein, a passageway having an inlet and an outlet defined in said housing, said first check valve being open to the outlet of the passageway when mounted in said coupling means, a second check valve mounted in the housing adjacent the outlet of said passageway to normally prevent flow through said outlet to the first check valve, a pressure actuated member controlling position of said second check valve and being operated in response to pressure to move the first and second check valves to open positions to permit flow through the housing with a coupler nipple held in the coupling means, said second check valve closing to prevent flow from the inlet through the outlet whenever there is no coupler nipple held in the coupling means regardless of the position of the pressure actuated member.

18. The hydraulic coupler device of claim 17 wherein said pressure actuated member comprises an actuator body slidably mounted in said housing, said passageway being defined in said actuator body, said second check valve including a valve member and a valve seat defined in said body for said valve member, said actuator body moving toward said coupler nipple in response to pressure, and means on the coupler nipple restraining movement of said valve member toward said coupler nipple before the actuator body is moved to a full open position to hold the valve member away from its seat when the actuator body is in a full open position.

* * * * *